Aug. 1, 1972 SUSUMU GENMA ET AL 3,681,225

METHOD OF MAKING A MAGNETIC DISC

Filed Nov. 23, 1970 2 Sheets-Sheet 1

S. GENMA,
A. KURODA,
T. KATO AND
F. KISHI
INVENTORS

BY Stevens, Davis, Miller & Mosher
ATTORNEYS

United States Patent Office 3,681,225
Patented Aug. 1, 1972

3,681,225

METHOD OF MAKING A MAGNETIC DISC

Susumu Genma, Tokyo, and Akio Kuroda, Toshio Kato, and Fusao Kishi, Yokohama, Japan, assignors to Victor Company of Japan, Limited, Yokohama, Japan Filed Nov. 23, 1970, Ser. No. 91,747
Claims priority, application Japan, Nov. 26, 1969, 44/94,243
Int. Cl. H01f *10/06*
U.S. Cl. 204—30 3 Claims

ABSTRACT OF THE DISCLOSURE

A method of making a magnetic disc wherein an electrically conducting material layer is formed on the surfaces of a base plate made by shaping a synthetic resinous material, then a magnetic material is applied to the coat by electrodeposition, and finally the surfaces are polished by a polishing material of very small grain size. The layer of magnetic material formed by electrodeposition has its surfaces rendered smooth by the polishing operation because minute fissures in the surfaces are removed and at the same time the magnetic material layer itself is annealed by the heat of friction.

The invention relates to magnetic discs and methods of making the same. More particularly, the invention is concerned with a magnetic disc having surfaces which are smooth, planar, highly abrasion resistant, and free from distortion, and a method of making such magnetic disc.

In one method known in the art, it has hitherto been customary to make a magnetic disc, used with a computer, for example, by plating a base of metal, particularly a base of light metal, such as aluminum, magnesium and the like, with copper after subjecting such plate to pretreatment, such as zinc substitution, and then plating the same with a magnetic material. Such method of the prior art has disadvantages in that surfaces of the magnetic discs made by this method are hard to polish and moreover the discs are high in cost because the base is made of metal.

Accordingly, this invention provides a magnetic disc and a method of making the same which obviate the aforementioned disadvantages of the prior art.

A principal object of this invention is to provide a magnetic disc which has very smooth surfaces because of the facts that the roughness of the surfaces of a plastic base can be minimized when the base is produced, the roughness can be further removed by levelling action in the plating operation, and increased smoothness of the surfaces can be achieved by heat polishing in the subsequent polishing operation.

Another object of the invention is to provide a magnetic disc which has increased levelness when rotating at high speeds, so that the magnetic heads are maintained in proper contact with the disc and their output power is increased, the disc has increased abrasion resistance, and no drop-out occurs.

A further object of the invention is to provide a magnetic disc in which the layer of magnetic material formed by plating is annealed by the heat of friction produced in the polishing operation and subsequent cooling, so that the disc is free from distortion.

Still another object of the invention is to provide a method of making the magnetic disc of the type described which comprises the steps of forming a layer of electrically conducting material layer on a plastic base plate, applying a magnetic material to said coat by electrodeposition, and polishing the surfaces of the layer of magnetic material.

Additional objects as well as features and advantages of this invention will become evident from the description set forth hereinafter when considered in conjunction with the accompanying drawings, in which.

Figure 1:
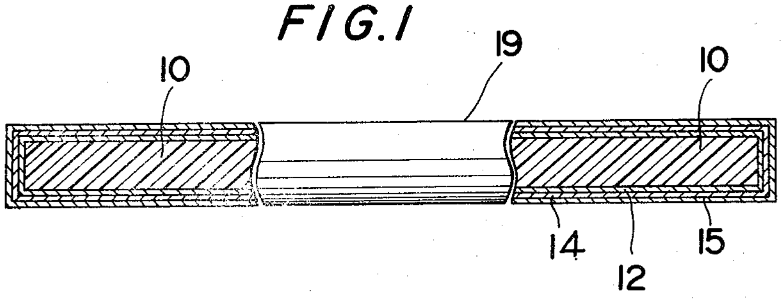
FIG. 1 is a longitudinal sectional view of the magnetic disc comprising one embodiment of this invention.

In the drawings, a plastic base plate 10 is formed such that it is relatively soft as compared with a metallic base plate. Is is used as a base material for making the magnetic disc according to this invention. More specifically, a material which is very low in plastic deformation, such as a polycarbonate, for example, and a material which is chemically weak, such as acrylonitrile-butadiene-styrene copolymer, for example, are blended in a suitable proportion to provide a mixture which is pressed by using a ferrotype plate having its surfaces polished such that irregularities thereon are within $0.1\mu$ so as to provide the base plate 10. The base plate 10 is shaped into a predetermined form (the shaping may be effected simultaneously as the material is pressed), treated with a mixture of 200 to 400 gm. sulfuric acid $H_2SO_4$, 50 to 100 gm. chromic acid $H_2CrO_4$ and 50 to 400 gm. water $H_2O$ at substantially 20° to 35° C. for approximately 1 to 20 minutes, washed with water, and activated by applying a stannous chloride solution and a palladium chloride solution (or a solution of a salt of other precious metal) so that a non-electrolytic plating layer 12 is formed by deposition on the base disc.

Figure 3:
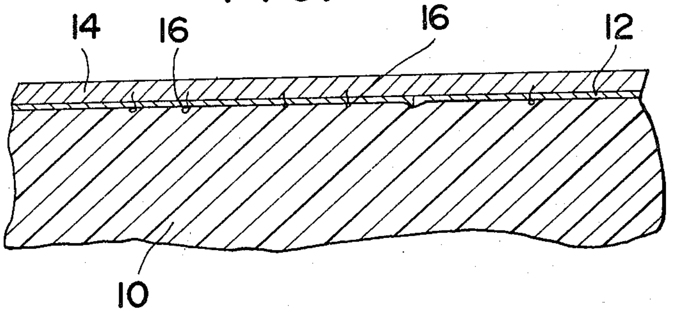
FIG. 3 and FIG. 4 are fragmentary sectional views, on an enlarged scale, of the disc having its layer of magnetic material applied by electrodeposition.

A multitude of minute openings 16 are formed in the surface regions of the plastic base plate 10 as shown in FIG. 3 by the surface activation treatment, and the same nonelectrolytic plating material of the nonelectrolytic plating layer 12 on the surfaces of the plastic base 10 fills up by deposition each of such openings 16. By applying a magnetic material by electrodeposition to the surfaces of plating layer 12 to form a magnetic material layer 14 thereon, it is possible to provide a very strong bond between the plastic base plate 10 and the magnetic material layer 14 applied by electrodeposition.

Figure 4:
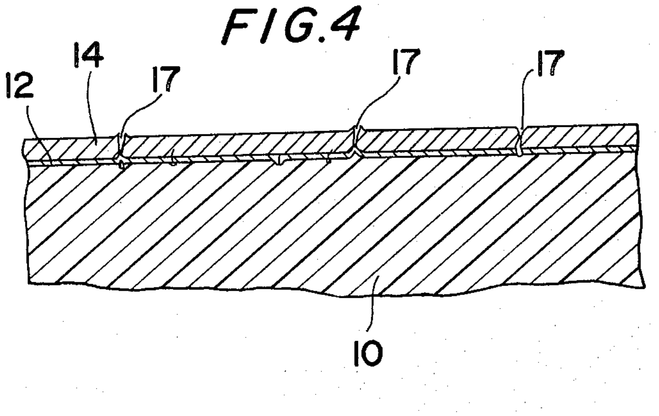

Since the plastic base plate 10 and magnetic material layer 14 applied by electrodeposition differ from each other in mechanical, physical and chemical properties and there are considerable internal stresses in the magnetic material layer 14 applied by electrodeposition, a multitude of fissures 17 are produced in the layer 14 as shown in FIG. 4. Therefore, if the magnetic disc made in this way is used without any further treatment, its surfaces will have large irregularities. This will cause the magnetic heads to jump and a drop-out to occur when the magnetic disc is used with a magnetic recording and reproducing apparatus, for example.

Figure 5:
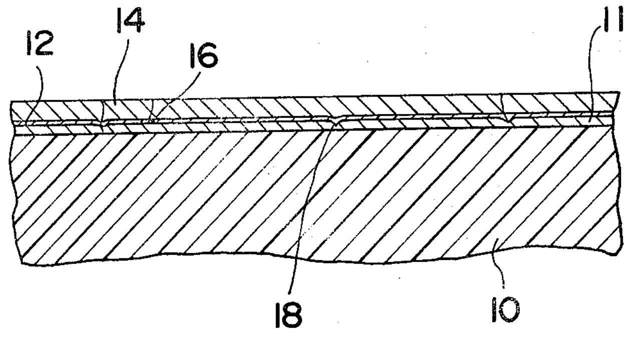
FIG. 5 is a fragmentary sectional view, on an enlarged scale, of the disc having the surfaces of its layer of magnetic material finished by polishing.

In order to remove the irregularities on the surfaces of the disc shown in FIG. 4, the surfaces of the disc are polished by using special polishing material or wax of very small grain size comprising $SiO_2$, $Fe_2O_3$, and $Al_2O_3$. By this polishing operation, the surfaces of the disc are rendered perfectly smooth as shown in FIG. 5 because the protrusions on the edges of the fissures 17 are ground and part of the material of the protrusions finds its way into the openings of fissures to be fused with the material of the layer 14 by the action of the heat of friction produced by polishing. When the polishing operation is carried out, a surface region 11 of the plastic base plate 10 immediately below the magnetic material layer 14 applied by deposition is softened by the heat of friction, so that portions of the magnetic material layer 14 below the fissures 17 sink into the surface region 11 of the plastic base plate 10. This further increases the force with which the magnetic material layer 14 and the plastic base plate 10 adhere to each other. The magnetic material layer 14 formed by electrodeposition is annealed as it is heated by the heat of friction and then cooled, so that the internal stresses existing therein to a certain degree are removed by the annealing.

Then, the disc is coated with a layer of rhodium or other metal of high chemical and abrasion resistance by electrodeposition to provide a protective layer 15 on the magnetic material layer 14. Thus, a magnetic disc 16 is completed.

Figure 7:
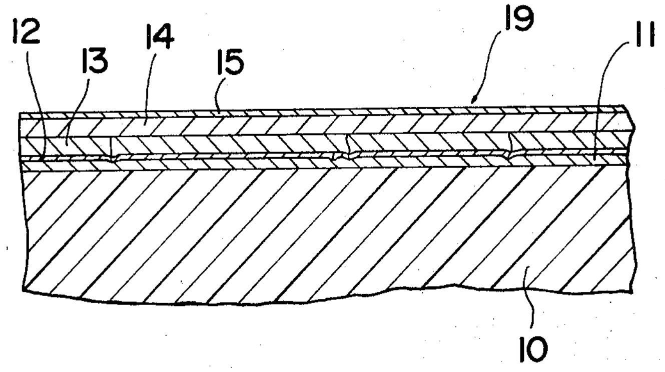

It is to be understood that, after the formation of the layer 12 by nonelectrolytic plating, the layer 12 may be coated with lustrous acid copper by plating to form a layer 13 as shown in FIG. 7. In this case, the layer 13 has its surfaces polished in the same manner as described above and grease is removed therefrom, and then the magnetic material layer 14 is formed immediately on the layer 13 by electrodeposition. In this example, the polishing of the magnetic material layer 14 applied by electrodeposition may be omitted.

Figure 2:
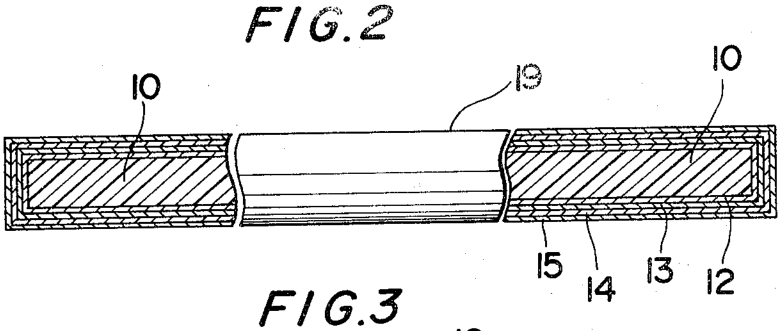
FIG. 2 is a longitudinal sectional view of the magnetic disc comprising another embodiment of this invention.
Figure 6:
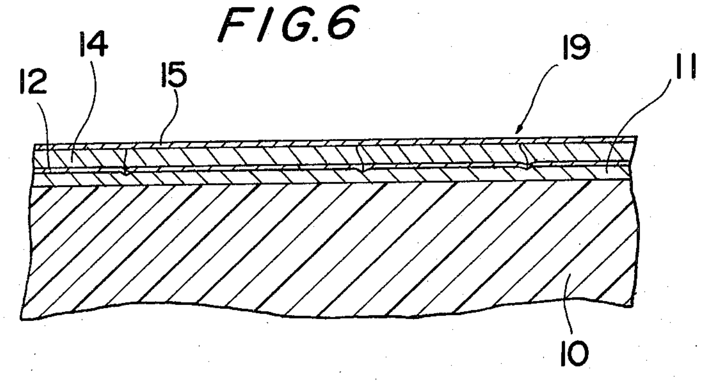
FIG. 6 and FIG. 7 are fragmentary enlarged views of the sectional views shown in FIGS. 1 and 2 respectively.

The magnetic discs 19 shown in FIGS. 6 and 7 in fragmentary enlarged views are shown in their entirety in FIGS. 1 and 2 respectively in longitudinal sectional views.

The embodiments shown and described above use the mixture of a polycarbonate and acrylonitrile-butadiene-styrene copolymer as a base material. It is to be understood that the present invention is not limited to this base material, and that any other suitable base material may be used.

For example, the magnetic disc according to this invention may be made by using a film made of polyester alone having a thickness in a range from about 50 to 180$\mu$. Such polyester film is activated by the aforementioned process, so that the film is coated with copper by nonelectrolytic plating. Thereafter, the film is coated with a Ni-Cu-P alloy by electroplating and polished by the aforementioned process to provide a magnetic disc.

Also, the magnetic disc according to this invention may be made by using a sheet made of a polycarbonate alone and having a thickness of about 1 mm. which is processed through various operations as aforementioned.

The magnetic disc made by the method according to this invention has many advantages. First of all, the disc can have its roughness minimized when its plastic base plate is formed, and the roughness can be further eliminated by levelling action in the plating operation. The subsequent polishing operation renders the discs as smooth as possible by heat polishing.

In the case of a magnetic disc made of a metal, the levelness of the disc shows no improvement when it is rotated at high speeds as compared with its levelness in ordinary conditions. In the present invention, however, the use of a synthetic resinous material for making a plastic base plate which is somewhat pliable enables the magnetic heads to be maintained in proper contact with the disc and to increase their output power. The disc itself has increased abrasion resistance, and no drop-out occurs.

When the thickness of the base plate is reduced and a base plate in sheet or film form is used, these advantages are further increased.

Moreover, the heat of friction in the polishing operation and the cooling to which the disc is subjected has the effect of annealing the magnetic material layer formed by electrodeposition, thereby rendering the disc free from distortion.

While the invention has been shown and described with reference to preferred embodiments thereof, it is to be understood that the invention is not limited to the specific forms, constructions and processes of the embodiments, and that many changes and modifications may be made therein without departing from the spirit and scope of the invention.

What we claim is:

1. A method of making a magnetic disc comprising the steps of shaping into a base plate a mixture of polycarbonate and acrylonitrile-butadiene-styrene copolymer; polishing the surfaces of the base plate within an irregularity of 0.1 micron; treating the base plate with a mixture of 200 to 400 gm. sulfuric acid, 50 to 100 gm. chromic acid and 50 to 400 gm. water at 20° to 35° C. for 1 to 20 minutes; washing the base plate with water; activating the surfaces of the base plate by applying a stannous chloride solution and a solution of a salt of precious metal; depositing a non-electrolytic plating layer on the base plate; electrodepositing a magnetic material layer on the non-electrolytic plating layer; and polishing the surfaces of the magnetic material layer with a material of small grain size including $SiO_2$, $Fe_2O_3$ and $Al_2O_3$ and annealing the magnetic layer by the heat of friction resulting from said polishing.

2. The method as defined in claim 1 wherein said solution of a salt of precious metal comprises a palladium chloride solution.

3. The method as defined in claim 1 further comprising the step of electrodepositing rhodium layer on the magnetic material layer.

References Cited

UNITED STATES PATENTS

| | | | |
|---|---|---|---|
| 3,150,939 | 9/1964 | Wenner | 117—240 |
| 2,470,775 | 5/1949 | Jernstedt et al. | 204—43 |
| 2,026,718 | 1/1936 | Weisberg et al. | 204—43 |
| 2,145,518 | 1/1939 | Lindh | 204—36 X |
| 2,728,719 | 12/1955 | Tucker et al. | 204—36 X |
| 3,152,971 | 10/1964 | Tomaszewski et al. | 204—36 UX |
| 3,531,322 | 9/1970 | Kefaas et al. | 117—240 X |
| 3,180,715 | 4/1965 | Simon | 117—235 X |
| 3,284,324 | 11/1966 | Appel et al. | 204—43 X |
| 3,421,986 | 1/1969 | Ruff et al. | 204—36 |

WILLIAM D. MARTIN, Primary Examiner

B. D. PIANALTO, Assistant Examiner

U.S. Cl. X.R.

29—196.3, 196.6, 199; 117—236, 237, 239, 240; 204—36, 40